(12) United States Patent
Glover

(10) Patent No.: US 9,145,047 B2
(45) Date of Patent: Sep. 29, 2015

(54) LIGHTWEIGHT ENGINE MOUNTING

(75) Inventor: Anthony R. Glover, Guildford (GB)

(73) Assignee: McLaren Automotive Limited, Surrey (GB)

( * ) Notice: Subject to any disclaimer, the term of this patent is extended or adjusted under 35 U.S.C. 154(b) by 243 days.

(21) Appl. No.: 13/635,393

(22) PCT Filed: Mar. 17, 2011

(86) PCT No.: PCT/EP2011/054083
§ 371 (c)(1),
(2), (4) Date: Nov. 28, 2012

(87) PCT Pub. No.: WO2011/113913
PCT Pub. Date: Sep. 22, 2011

(65) Prior Publication Data
US 2013/0112840 A1    May 9, 2013

(30) Foreign Application Priority Data
Mar. 17, 2010    (GB) .................................. 1004473.3

(51) Int. Cl.
*F16M 13/00* (2006.01)
*B60K 5/12* (2006.01)

(52) U.S. Cl.
CPC ............. *B60K 5/1216* (2013.01); *B60K 5/1241* (2013.01)

(58) Field of Classification Search
USPC ......... 248/603, 604, 605, 606, 607, 610, 611, 248/612, 613, 614, 560, 564, 637, 638, 674, 248/554, 555, 556, 557; 267/141, 141.1, 267/141.2, 141.3, 293, 294, 140.11
See application file for complete search history.

(56) References Cited

U.S. PATENT DOCUMENTS 2,864,573 A * 12/1958 Olley et al. ................... 248/605
3,825,090 A *  7/1974 Runkle et al. ................ 180/292
(Continued)

FOREIGN PATENT DOCUMENTS

DE    4307999 A1    9/1994
DE    20219925      4/2004
(Continued)

OTHER PUBLICATIONS

PCT International Search Report dated Jul. 19, 2011 in International Application No. PCT/EP2011/054083 filed Mar. 17, 2011, Form ISA 210.
(Continued)

*Primary Examiner* — Monica Millner
(74) *Attorney, Agent, or Firm* — Vista IP Law Group, LLP

(57) ABSTRACT

A mounting arrangement for a powertrain of a vehicle, the powertrain comprising an engine operable to produce a torque about a torque axis and the mounting arrangement comprising: a primary coupling connected at a primary mounting point of the powertrain and configured to securely couple the powertrain to a structural member of the vehicle; and, connected between the powertrain and one or more structural members of the vehicle: a pair of pitch control struts configured to substantially inhibit movement of the powertrain in directions perpendicular to the torque axis; and a roll control strut configured to substantially inhibit rotational motion of the engine about the torque axis; wherein the pitch control and roll control struts are connected to the powertrain and the one or more structural members of the vehicle at strut mountings configured to compliantly resist movements of the powertrain about the primary coupling in a direction parallel to the torque axis.

32 Claims, 2 Drawing Sheets

(56) References Cited

U.S. PATENT DOCUMENTS

| | | | |
|---|---|---|---|
| 4,365,771 A * | 12/1982 | Halwes | 244/17.27 |
| 4,458,863 A * | 7/1984 | Smith | 244/54 |
| 5,133,427 A * | 7/1992 | Arvidsson et al. | 180/297 |
| 5,186,686 A * | 2/1993 | Staples et al. | 464/69 |
| 5,205,374 A * | 4/1993 | Love et al. | 180/300 |
| 5,443,229 A * | 8/1995 | O'Brien et al. | 244/54 |
| 5,452,575 A * | 9/1995 | Freid | 60/797 |
| 5,523,530 A * | 6/1996 | Byrnes et al. | 181/208 |
| 5,566,919 A * | 10/1996 | Shephard | 248/604 |
| 5,746,391 A * | 5/1998 | Rodgers et al. | 244/54 |
| 5,782,430 A * | 7/1998 | Mouille | 244/17.27 |
| 5,826,823 A * | 10/1998 | Lymons et al. | 244/110 B |
| 6,123,293 A * | 9/2000 | Breitbach et al. | 244/54 |
| 6,126,110 A * | 10/2000 | Seaquist et al. | 244/54 |
| 6,328,293 B1 * | 12/2001 | Olsen | 267/140.11 |
| 6,390,223 B1 * | 5/2002 | Savage et al. | 180/300 |
| 6,588,534 B1 * | 7/2003 | Daly | 180/300 |
| 6,629,576 B2 * | 10/2003 | Kramer et al. | 180/291 |
| 7,063,290 B2 * | 6/2006 | Marche | 244/54 |
| 7,249,756 B1 * | 7/2007 | Wilke et al. | 267/152 |
| 7,461,815 B2 * | 12/2008 | Almeras et al. | 244/54 |
| 7,562,737 B2 * | 7/2009 | Miyahara et al. | 180/291 |
| 7,631,835 B2 * | 12/2009 | Ferrer | 244/17.27 |
| 7,806,363 B2 * | 10/2010 | Udall et al. | 244/54 |
| 7,967,242 B2 * | 6/2011 | Combes et al. | 244/54 |
| 8,567,771 B2 * | 10/2013 | Kappich et al. | 267/140.11 |
| 8,702,377 B2 * | 4/2014 | Cottrell et al. | 415/119 |
| 2003/0066928 A1 * | 4/2003 | Brefort et al. | 244/54 |
| 2004/0245383 A1 * | 12/2004 | Udall | 244/54 |
| 2005/0081531 A1 * | 4/2005 | Stretton et al. | 60/797 |
| 2006/0157292 A1 * | 7/2006 | Miyagawa et al. | 180/312 |
| 2011/0084192 A1 * | 4/2011 | Olsen et al. | 248/557 |

FOREIGN PATENT DOCUMENTS

| | | |
|---|---|---|
| DE | 102008039479 A1 | 2/2010 |
| WO | 8905246 A1 | 6/1989 |

OTHER PUBLICATIONS

PCT Written Opinion dated Jul. 19, 2011 in International Application No. PCT/EP2011/054083 filed Mar. 17, 2011, Form ISA 237.

\* cited by examiner

LIGHTWEIGHT ENGINE MOUNTING

BACKGROUND OF THE INVENTION

This invention relates to a mounting arrangement for a vehicle powertrain.

A mounting arrangement for an engine must fulfil two main requirements. Firstly, the mounting must be able to support and control the powertrain under all operating loads, and secondly, the mounting must be strong enough to restrain the engine in the event of a crash. Various measures of crash worthiness are used for automobiles around the world, such as the European New Car Assessment Programme (Euro NCAP), with each measure defining a set of minimum safety requirements that a new vehicle must satisfy. Generally automobile manufacturers strive to exceed the minimum requirements so as to ensure that their vehicles score highly in each measure of crash worthiness.

In an automobile and many other types of vehicle, these requirements must be achieved while delivering an environment in line with the comfort targets for the vehicle in relation to the occupants and persons outside the vehicle. An engine is a significant source of noise and vibration in a vehicle and care must therefore be taken to ensure that the noise and modes of vibration of an engine are sufficiently isolated from the vehicle structure so as not to exceed the noise and vibration targets. Measurements of the noise and vibration characteristics of a vehicle are generally referred to as Noise, Vibration and Harshness (NVH) tests and comprise a mixture of objective and subjective tests on the noise and vibration developed by a vehicle.

In conventional mounting arrangements, an engine is supported by several rigid brackets coupled to the engine by means of flexible bushings, which are typically pan type bushings mounted onto the sides of the engine. The various forces generated between the engine and vehicle structure are distributed over the brackets, which work together to restrain the engine in the event of a crash. Each rigid coupling is generally stiff in all three dimensions so as to provide a secure connection between the engine and vehicle chassis and avoid any resonant couplings between the engine and vehicle. NVH performance can be achieved by appropriate tuning of the flexible bushings.

Such conventional engine mounting arrangements can provide the necessary strength but the rigid brackets add a significant amount of weight to the basic load bearing frame of an automobile. Furthermore, due to package constraints it is often difficult to attach to stiff regions of the body structure which can compromise the mount isolation, resulting in poor NVH performance of the system.

There is therefore a need for an improved powertrain mounting arrangement for vehicles which provides adequate NVH control and isolation.

SUMMARY OF THE INVENTION

According to the present invention there is provided a mounting arrangement for a powertrain of a vehicle, the powertrain comprising an engine operable to produce a torque about a torque axis and the mounting arrangement comprising: a primary coupling connected at a primary mounting point of the powertrain and configured to securely couple the powertrain to a structural member of the vehicle; and, connected between the powertrain and one or more structural members of the vehicle: a pair of pitch control struts configured to substantially inhibit movement of the powertrain in directions perpendicular to the torque axis; and a roll control strut configured to substantially inhibit rotational motion of the powertrain about an axis parallel to the torque axis; wherein the pitch control and roll control struts are connected to the powertrain and the one or more structural members of the vehicle at strut mountings configured to compliantly resist movements of the powertrain about the primary coupling in a direction parallel to the torque axis.

Preferably the strut mountings of the pitch control struts are flexible mounts having, in comparison to their stiffness in response to movement of the powertrain in directions perpendicular to the torque axis, a low stiffness in response to movement of the mounting points of the struts at the powertrain relative to the mounting points of the struts at the structural members.

Preferably the strut mountings of the roll control strut are flexible mounts having, in comparison to their stiffness in response to rotational movement of the powertrain about an axis parallel to the torque axis, a low stiffness in response to movement of the mounting point of the strut at the powertrain relative to the mounting point of the strut at the corresponding structural member.

Preferably the primary coupling comprises a flexible mount having, in comparison to its stiffness in response to movement of the powertrain parallel to the torque axis, a low stiffness in response to rotational movement of the powertrain about the primary coupling.

Preferably the bending stiffness of each of the pitch control struts and the roll control strut is significantly lower than its stiffness along its length between its strut mountings.

Preferably the primary coupling comprises an anchor rigidly connected to the powertrain engaged about an axle which is rigidly connected to the respective structural member of the vehicle, the axle being oriented substantially perpendicular to the torque axis. Preferably the flexible mount is an elastic bushing located between the anchor of the powertrain and the axle of the structural member. Preferably the elastic bushing is configured to have a low torsional stiffness in comparison to its radial stiffness.

Preferably each of the strut mountings at the powertrain comprise a pin rigidly connected to the powertrain and each of the strut mountings at one of the one or more structural members of the vehicle comprise a pin rigidly connected to the one of the one or more structural members of the vehicle, the ends of each pitch control strut and the roll control strut being engaged about their respective axles so as to form a structural connection resilient to tension and compression of the strut between the powertrain and the one or more structural members of the vehicle. Preferably each pin is substantially perpendicular to the axle of the primary coupling. Preferably each pin is substantially parallel to the torque axis.

Preferably the strut mountings of the pitch control struts and the roll control strut comprise elastic bushings arranged between the struts and each of their respective pins. Preferably the elastic bushings are configured to have a low conical stiffness in comparison to their radial stiffness about their respective pins. Preferably the elastic bushings are configured to have a low torsional stiffness in comparison to their radial stiffness about their respective pins.

Preferably the radial stiffness rate of the elastic bushings is configured to vary about each pin in such a way that, when the weight of the powertrain acts on the mounting arrangement, the radial stiffness about the pin is substantially constant.

Preferably the pitch control struts are oriented such that each strut is substantially directed towards the torque axis of the engine.

Preferably the strut mounting of the roll control strut at the powertrain is located at the periphery of the powertrain. Preferably the roll control strut is oriented to be substantially perpendicular to the torque axis.

Preferably the powertrain further comprises a transmission housing securely mated at one end of the engine and the primary mounting point is rigidly attached to the transmission housing.

Preferably the strut mountings of the pair of pitch control struts at the powertrain are attached to the engine at the end remote from the transmission housing.

Preferably the engine is an internal combustion engine and the strut mountings are attached to the engine block.

Preferably the pitch control struts lie in a common plane perpendicular to the torque axis.

Preferably the distance in the direction of the torque axis between the primary mounting point and the strut mountings of the pitch control struts at the powertrain is at least the length of the engine along the direction of the torque axis.

Preferably the strut mountings of the pitch control struts at the powertrain lie on either side of the plane defined by the torque axis and the primary mounting point.

Preferably the primary coupling, the pitch control struts and the roll control strut are the only structural connections between the vehicle and the powertrain.

Preferably the engine is mounted in the vehicle such that the torque axis is substantially parallel to the major direction of travel of the vehicle.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to mounting arrangements for vehicle powertrains, including the powertrains of land-based vehicles, aircraft and boats, but in particular the powertrains of automobiles. A vehicle powertrain comprises components of the vehicle which generate power and torque for propelling the vehicle. A powertrain can include one or more of: an engine (or a plurality of engines), a gearbox, a torque converter, a flywheel, and one or more clutches. In the examples given below, the invention is described in relation to mounting arrangements for a powertrain comprising an internal combustion engine, but the engine of a powertrain could be any kind of engine for which a lightweight mounting arrangement having good NVH properties is desired. The mounting arrangement described herein is particularly advantageous for V-engines having a flat crankshaft.

Figure 1:
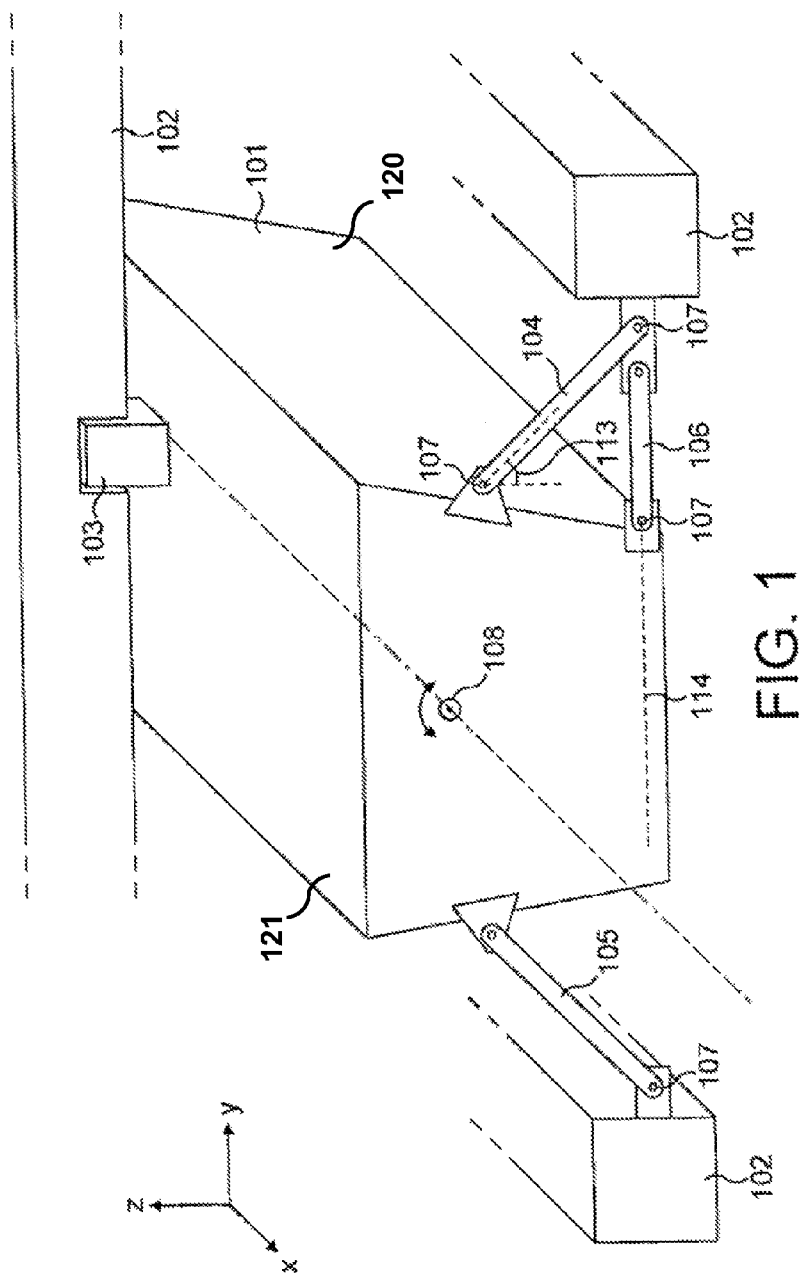
FIG. 1 is a schematic drawing of a vehicle powertrain mounting arrangement in accordance with the present invention.

A powertrain mounting arrangement configured in accordance with the present invention is shown in FIG. 1. Engine 101 is supported in an automobile by a primary coupling 103 and an arrangement of struts 104, 105 and 106 connected between mounting points 107. The primary coupling may be directly connected to the engine block 121, or to another component of the vehicle powertrain which is securely mated to the engine block 121, such as a transmission housing 120. The torque produced by the engine acts about an axis 108, which is parallel to the primary direction of motion of the vehicle along the x-axis: the engine is therefore mounted in a longitudinal orientation. The x, y and z axes are indicated in the figure. Struts 104, 105 and 106 are configured to each lie in a plane which is perpendicular to axis 108. Preferably struts 104 and 105 lie in the same plane. Most preferably struts 104, 105 and 106 all lie in the same plane.

The primary coupling and struts connect the powertrain to structural members 102, which form part of the supporting structure of the vehicle. For example, in an automobile, the structural members could be the chassis of the vehicle, a space-frame forming the basic load-bearing structure of the vehicle, or any other elements of the vehicle capable of supporting the engine. It is advantageous if the points on structural members 102 at which the primary coupling and struts connect are points of high stiffness along the structural members. This enables good structural isolation of the powertrain due to the body attachment location at the structural members being significantly stiffer that the mount. This also ensures there are no local structural modes of the body attachment that can be resonantly driven by the modes of oscillation of the engine.

The primary coupling is configured to control translational movement of the powertrain in the longitudinal direction. This means that the arrangement of struts 104, 105 and 106 does not need to be sufficiently stiff to react to longitudinal loads. This also means that the primary coupling is substantially responsible for restraining the engine in the event of a crash. Preferably the primary coupling is positioned along the centreline of the engine directly above or below the torque axis. For most engines, this ensures that the forces about the primary coupling are well balanced and are not unevenly transferred to the chassis of the automobile. It will be apparent to the skilled person that for engines having certain cylinder configurations (such as an odd number of cylinders in a V or flat configuration) it could be advantageous to offset the primary coupling in the y-direction in order to achieve a balance of torsional forces about the primary coupling.

Figure 3:
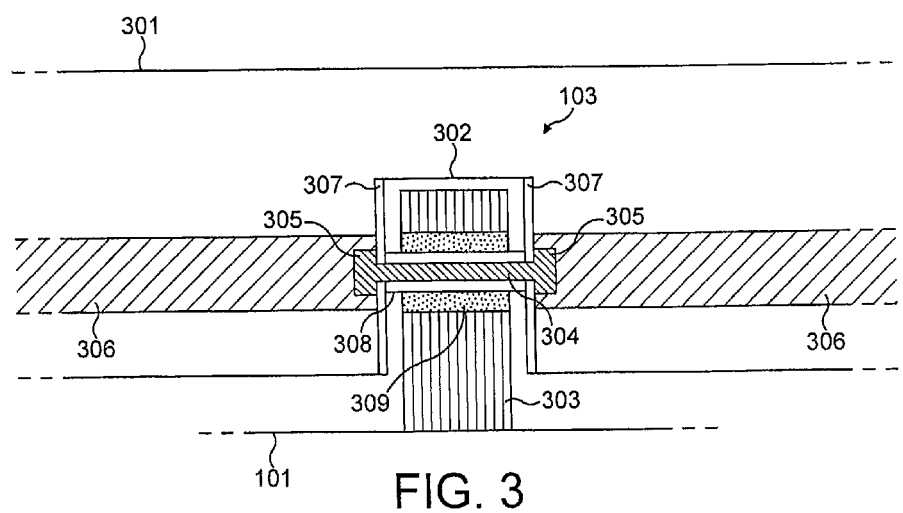
FIG. 3 is a schematic cross-section of a primary coupling in accordance with a preferred embodiment of the present invention.

In the preferred embodiment, there is a single primary coupling as shown in FIG. 1 which is configured, in the absence of any other support for the engine, to have a low torsional stiffness (relative to its radial stiffness about the axle on which the primary coupling is mounted) in response to pitching movements of the powertrain about an axis parallel to the y-axis. This can be achieved by means of an elastic bushing configured to have a high radial stiffness and a low torsional stiffness. The axis of the primary coupling could be defined by an axle rigidly connected to the structure of the vehicle. An exemplary primary coupling is shown in FIG. 3. There may be one or more primary couplings.

Note that in use the powertrain does not rotate significantly about the primary coupling because such movements are controlled by struts 104, 105 and 106. Powertrain modes associated with pitch of the engine about the primary coupling are therefore substantially damped and controlled by the arrangement of struts. Elastic bushings at the primary coupling, the pitch control struts and the roll control strut can be individually tuned to the control various vibrational modes of the engine.

Control struts 104 and 105 are configured to restrain the movement of the powertrain in a plane perpendicular to the torque axis of the engine 108. This is achieved by mounting the struts at an acute angle 113 to the vertical such that due to the weight of the powertrain the struts are either in compression (as shown in FIG. 1) or in tension (if the strut arrangement shown in FIG. 1 were to be inverted—say, by reflection in the x-y plane in which the torque axis of the engine lies). It is advantageous if the struts are arranged such that they are in compression since this places the weight of the struts low down. This is particularly advantageous in the design of sports cars.

In a preferred embodiment, the angle 113 is chosen such that the struts are directed substantially towards the torque axis of the engine. This ensures that control struts 104 and 105 operate substantially in pure compression or tension along their length. This leaves the control of the rotational movement of the engine to roll control strut 106, which is also oriented to experience substantially tensile or compressive forces.

Roll control strut 106 is configured to restrain the rotational movement of the engine about torque axis 108. Rotational forces arise due to the reaction torque from the crankshaft of the engine, rotational modes of oscillation due to the configuration of the engine (which depends on the number and orientation of the cylinders) and rotational vibrations produced during operation of the engine. In FIG. 1, roll control strut 106 is horizontal between the base of the engine 101 and structural member 102. However, other orientations of the roll control strut are possible in the y-z plane perpendicular to torque axis 108.

It is advantageous if the roll control strut is arranged such that a line 114 extrapolated from the end of the strut closest to the engine does not pass through the torque axis of the engine. The perpendicular distance between line 114 and the torque axis is preferably as large as possible—this can be achieved by attaching the roll control strut at the periphery of the engine. The net effect is to cause the forces experienced by the roll control strut to be substantially tensile or compressive along the length of the strut. Most preferably the roll control strut is connected to the engine at a point remote from the primary coupling in the z-direction. This ensures that the roll control strut has good control of the roll of the engine about the primary mounting point.

It is advantageous that the attachment points of the primary coupling 110 and the arrangement of struts 104, 105 and 106 lie well spaced along the length of the powertrain in the longitudinal x-direction. This improves pitch control of the engine and helps to ensure that the major forces acting on the struts are tensile or compressive. In a preferred embodiment, the primary coupling is attached to a transmission housing 120 of the powertrain to which the engine block 121 is securely mated. This allows the spacing along the x-axis between the primary coupling and the arrangement of struts to be increased over the spacing possible if both the primary coupling and the arrangement of struts are connected directly to the engine block 121.

Each of the pitch control struts 104, 105 and the roll control strut 106 forms a double-compliant link between the engine and chassis, with the mounting points at each end of the strut being coupled to the engine or chassis (as appropriate) by means of a flexible mount. The flexible mounts are preferably elastic bushings having stiffness rates selected so as to control the powertrain, achieve modal alignment targets and prevent resonance of the mounting arrangement during operation of the engine. The flexible mounts at the ends of each strut are configured to resiliently allow some relative movement of the end of each strut in the longitudinal x-direction. In other words, the flexible mounts have a relatively low stiffness in response to longitudinal movement of the mounting points of the struts at the engine relative to the mounting points of the struts at the structural members. Furthermore, each flexible mount has a relatively low stiffness in response to rotation of the corresponding strut about the flexible mount in the plane defined by struts 104, 105 and 106. This means that the pitch control and roll control struts do not need to have a high bending stiffness in order to control the powertrain, allowing the struts to be light and efficient. The primary coupling is preferably configured through appropriate tuning of its non-linear elastic properties to ensure that the flexible mountings at the struts do not lock out under extreme accelerations or torque events.

Preferably the flexible mounts at the mounting point of each strut are elastic bushings connected about a pin oriented so as to define an axis substantially parallel to the longitudinal axis. By configuring the elastic bushings to have a low conical stiffness in comparison to their radial stiffness, the arrangement of struts can be arranged to have relatively low stiffness in response to longitudinal movement of the mounting points of the struts at the engine relative to the mounting points of the struts at the structural members. By configuring the elastic bushings to have a low torsional stiffness in comparison to their radial stiffness, the struts can be arranged to have relatively low stiffness in response to rotational movements about their corresponding pins.

Good control of the powertrain and NVH isolation can be achieved through appropriate tuning of the conical, radial and torsional stiffnesses of the elastic bushings. Such bushings can be made from rubber or similar synthetic materials, as is well known in the art.

The struts control the movement of the powertrain about the primary coupling as follows. If the engine pitches slightly about the primary coupling, the ends of the control struts 104 and 105 can move with the engine in the x-direction. However, because the primary coupling is spaced from the control struts by some distance along the x-axis, any slight movement in the x-direction of the parts of the engine remote from the primary coupling is accompanied by a translation in the z-direction—i.e. the engine swings slightly about the primary coupling. This slight movement in the z-direction is restrained by the control struts 104 and 105 because such movement causes a compression or tension of the struts. Any roll movement of the engine parallel to the torque axis is restrained by the roll control strut because such movement causes a compression or tension of the strut.

Control of the powertrain in terms of engine travel and loading is achieved by tuning the linear and non-linear properties of the flexible mounts at the primary coupling and at each end of the struts. NVH isolation can be tuned by adjusting the stiffness of the flexible mounts in different directions in response to movements generated by the dominant modes of vibration of the engine. The mounting arrangement described herein can provide excellent powertrain control along with excellent NVH isolation of the powertrain from a vehicle chassis.

Because the struts are configured so as to substantially experience only tensile or compressive forces along their length, the struts can be significantly lighter than conventional rigid brackets which are engineered to be stiff in all three dimensions. Furthermore, the use of struts allows the distance between the structural members 102 and the engine to be greater without a significant increase in weight. This is because it is relatively straightforward to engineer a lightweight strut that is strong in tension/compression, whereas increasing the size of a conventional rigid bracket would significantly increase the weight of the engine mountings. The struts can therefore be readily configured to attach at the stiffest parts of the chassis. These areas have high dynamic stiffness which enables good isolation and therefore good NVH performance.

For an engine mounted such that its torque axis is horizontal (with the direction of the weight of the vehicle during rest defining the vertical), the primary coupling and the mounting points of the pair of pitch control struts at the powertrain are preferably well spaced apart in height (i.e. in the vertical z-direction). In other words, if the primary coupling is attached at the top-side of the powertrain, the mounting points of the pair of pitch control struts are attached at the bottom-side of the powertrain, and vice versa. This ensures that the engine is well braced in all three dimensions.

Conventional teaching dictates that an engine should be mounted on rigid brackets by means of flexible bushings, which provide the necessary NVH control. It has been thought that mounting an engine on linkages which allow movement at both ends would lead to the amplification of vibrations produced by the engine. However, the present invention avoids these problems by using a primary coupling to retain the engine longitudinally and an arrangement of struts to control the movements of the engine in other directions. Furthermore, by arranging for the primary coupling, the pitch control struts and the roll control struts to exhibit low stiffness in different modes of movement of the powertrain, the struts can be made light enough that the flexible modes of the struts lie above the major vibrational frequencies produced by the engine. For a high performance V8 engine this means above around 300 Hz.

The rigid body modes of the links can be controlled in dependence on the torsional, conical and radial elastic rates selected for the flexible mounts, enabling them to be positioned outside other structural modes. The link system is also preferably highly damped in the linear region of the flexible mounts which results in limited transfer of vibrations across the mounting system.

Engine mounting arrangements configured in accordance with the present invention can provide excellent NVH characteristics through appropriate tuning of the compliant bushings. The mounting arrangement described herein is particularly suitable for mounting engines having strong lateral forcing, such as engines having a flat crankshaft. This is because the compliant bushings of the roll control strut can be tuned to react and control the lateral forcing.

Figure 2:
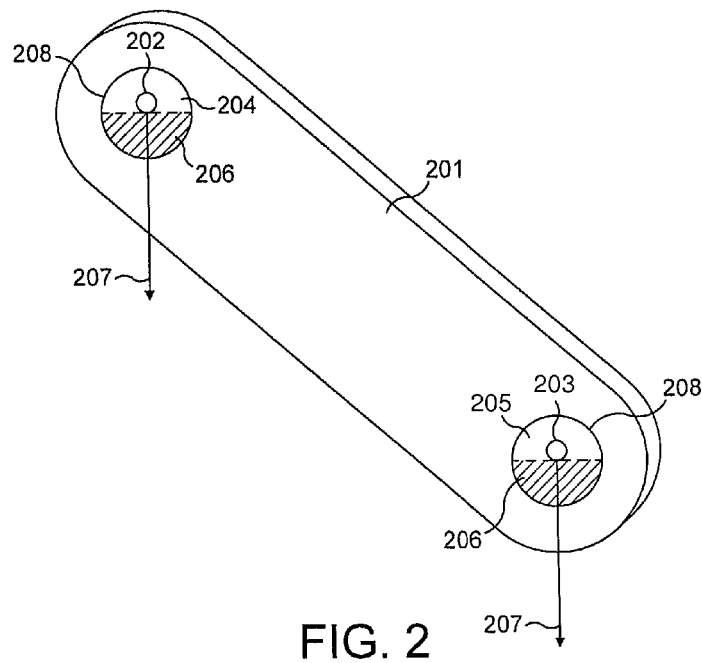
FIG. 2 is a schematic drawing of a strut in accordance with a preferred embodiment of the present invention.

A schematic diagram of an exemplary control or roll control strut 201 is shown in FIG. 2. The two mounting points of the strut 202 and 203 are shown at each end of the strut 201. Each mounting point is surrounded by an elastic bushing 204, 205 for providing NVH characteristics. Note that the bushings at each end of a strut need not have the same characteristics. The bushing could be a natural or synthetic rubber compound. The compliant bushings are shown as part of the strut but the bushings could in fact be supported at the mounting points to which the strut attaches.

The mounting points 202, 203 are offset in the elastic bushing 204, 205 along the length of the strut such that, when the weight of the engine acts on the strut (shown by arrows 207), the mounting points become centred in the elastic bushings due to compression of regions 206 of the bushings. The offset of a mounting point within the elastic bushing occurs along the length of the strut because of the configuration of the mounting arrangement—i.e. because the links can only react loads along their length due to the low torsional and conical stiffness of the mounts.

Furthermore, the bushes are designed such that when the weight of the engine acts on the strut, the radial stiffness rate in the two zones is substantially equal. The stiffness rate can be varied through the bushings by varying the shape and size of inclusions (voids) in the compliant material of the bushings, as is well known in the art. Such techniques allow each compliant bushing to be tuned to have the appropriate stiffness rate in each direction so as to achieve the desired NVH characteristics.

An exemplary primary coupling for attachment of a powertrain to a structural member is shown in cross-section in FIG. 3. The figure shows a beam 301 having a cut-out region 302 into which an anchor 303 of the primary coupling 103 is attached. Anchor 303 is attached around a bolt 304 which extends across the cut-out region and supports the weight of the powertrain 101. In order to allow the powertrain to be releasable from the primary coupling (and to allow the powertrain to be attached following manufacture of the structural parts of the vehicle), bolt 304 is removable and is fixed in place at one end by nut 305. Rather than providing additional cut-outs (which would weaken the beam) to allow access to the nut and bolt of the primary coupling, access channels 306 are provided along the length of the beam. The nut and bolt are accessible by means of these access channels, allowing the nut and bolt to be tightened and released, and hence the powertrain 101 to be mounted and unmounted from the beam. Preferably the access channels are tubular and are configured to contribute to the stiffness of the beam.

Plates 307 define the sides of the cut-out region 302. The plates may form part of the contiguous whole of the beam, or could be plates bonded in place so as to define the sides of the cut-out region 302. For example, for a substantially hollow extruded aluminium beam, the plates are preferably aluminium plates welded into place so as to face the two sides of the cut-out region. In order to avoid stressing plates 307 when the nut and bolt are tightened together, a screw adjuster 308 which is arranged between the plates and torqued up prior to the nut and bolt being tightened so as to preload the plates. Thus, the screw adjuster spacer expands to fill the cut-out region and support plates 307 against the compressive forces acting across the cut-out region due when the nut and bolt are tightened. This is particularly important if the sidewalls have been welded in place because welds cannot typically handle the same loads without failing as a contiguous beam of the same material. As shown in FIG. 3, the bolt passes through the screw adjuster.

The primary coupling further comprises a compliant bushing 309 between the threaded spacer and the anchor which is configured to dampen noise and vibrations generated at the engine. Through appropriate design of the bushing, the coupling of noise and vibrations between the powertrain (by means of rigid anchor 303) and the vehicle chassis (beam 301) can be controlled, and the NVH characteristics of the primary coupling can be tuned. Preferably the mounting point of the bolt and threaded spacer in compliant bushing 309 is offset in the same manner described as compliant bushings 204 and 205, which are described above in relation to FIG. 2. It is also preferable that the stiffness rate of the compliant bushing varies about the mounting point in the same manner as for compliant bushings 204 and 205.

The primary coupling arrangement shown in FIG. 3 is particularly advantageous in combination with the invention described in relation to FIGS. 1 and 2 because it provides a very strong mounting point suitable for restraining the movement of the powertrain in a head-on collision. Conventionally a beam would be weakened by the provision of a large (relative to the thickness of the beam) mounting point suitable for restraining the powertrain of a vehicle. The cut-out region in FIG. 3 could extend through more than 50% of the thickness of the beam, or even through 60% or 70% of the beam thickness. The primary coupling arrangement shown in FIG. 3 can actually strengthen a beam due to the provision of the tubular access channels and because the sidewalls of the cut-out region of the beam are not under significant stress.

The structural members described herein are preferably substantially hollow extruded aluminium beams. Extruded aluminium beams can be manufactured to have a very high strength to weight ratio and are therefore particularly suitable for use as the members of a vehicle structure or frame for supporting the powertrain of a vehicle.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A mounting arrangement for a powertrain of a vehicle, the powertrain comprising an engine operable to produce a torque about a torque axis and the mounting arrangement comprising:
a primary coupling connected at a primary mounting point of the powertrain and is capable of securely coupling the powertrain to a structural member of the vehicle;
and, connected between the powertrain and one or more structural members of the vehicle:
a pair of pitch control struts that substantially inhibit movement of the powertrain in directions perpendicular to the torque axis; and
a roll control strut that substantially inhibit rotational motion of the powertrain about an axis parallel to the torque axis;
wherein the pair of pitch control struts and the roll control strut are connected to the powertrain and the one or more structural members of the vehicle at strut mountings that compliantly resist movements of the powertrain about the primary coupling in a direction parallel to the torque axis, each strut mounting having a mounting point;
wherein the strut mountings of the pair of pitch control struts are flexible mounts having, in comparison to their stiffness in response to movement of the powertrain in directions perpendicular to the torque axis, a low stiffness in response to movement of the mounting points of the pair of pitch control struts at the powertrain relative to the mounting points of the pair of pitch control struts at the one or more structural members; and
wherein the strut mountings of the roll control strut are flexible mounts having, in comparison to their stiffness in response to rotational movement of the powertrain about an axis parallel to the torque axis, a low stiffness in response to movement of the mounting point of the roll control strut at the powertrain relative to the mounting point of the roll control strut at the one or more structural members.

2. The mounting arrangement as claimed in claim 1, wherein the primary coupling comprises a flexible mount having, in comparison to the flexible mount's stiffness in response to movement of the powertrain parallel to the torque axis, a low stiffness in response to rotational movement of the powertrain about the primary coupling.

3. The mounting arrangement as claimed in claim 1, wherein the bending stiffness of each of the pair of pitch control struts has a bending stiffness that is significantly lower than each of the pair of pitch control strut's stiffness along each of the pair of pitch control strut's length; and the bending stiffness of the roll control strut has a bending stiffness that is significantly lower than the roll control strut's stiffness along the roll control strut's length.

4. The mounting arrangement as claimed in claim 1, wherein the primary coupling comprises an anchor rigidly connected to the powertrain engaged about an axle which is rigidly connected to the structural member of the vehicle, the axle being oriented substantially perpendicular to the torque axis.

5. The mounting arrangement as claimed in claim 4, wherein the primary coupling comprises a flexible mount having, in comparison to the flexible mount's stiffness in response to movement of the powertrain parallel to the torque axis, a low stiffness in response to rotational movement of the powertrain about the primary coupling; and wherein the flexible mount of the primary coupling is an elastic bushing located between the anchor of the powertrain and the axle.

6. The mounting arrangement as claimed in claim 5, wherein the elastic bushing has a low torsional stiffness in comparison to the elastic bushing's radial stiffness.

7. The mounting arrangement as claimed in claim 1, wherein each of the strut mountings at the powertrain comprise a pin rigidly connected to the powertrain and each of the strut mountings at one of the one or more structural members of the vehicle comprise a pin rigidly connected to the one of the one or more structural members of the vehicle, the ends of each of the pair of pitch control struts and the roll control strut being engaged about their respective pins so as to form a structural connection resilient to tension and compression of each of the pair of pitch controls strut and roll control strut between the powertrain and the one or more structural members of the vehicle.

8. The mounting arrangement as claimed in claim 7, wherein the primary coupling comprises an anchor rigidly connected to the powertrain engaged about an axle which is rigidly connected to the respective structural member of the vehicle, the axle being oriented substantially perpendicular to the torque axis; and wherein each pin is substantially perpendicular to the axle of the primary coupling.

9. The mounting arrangement as claimed in claim 7, wherein each pin is substantially parallel to the torque axis.

10. The mounting arrangement as claimed in claim 8, wherein each pin is substantially parallel to the torque axis.

11. The mounting arrangement as claimed in claim 7, wherein the strut mountings of the pair of pitch control struts comprise elastic bushings arranged between each of the pair of pitch control struts and each of their respective pins; and wherein the strut mountings of the roll control strut comprise elastic bushings arranged between the roll control strut and each of their respective pins.

12. The mounting arrangement as claimed in claim 8, wherein the strut mountings of each of the pair of pitch control struts comprise elastic bushings arranged between each of the pair of pitch control struts and each of their respective pins; and wherein the strut mountings of the roll control strut comprise elastic bushings arranged between the roll control strut and each of their respective pins.

13. The mounting arrangement as claimed in claim 9, wherein the strut mountings of each of the pair of pitch control struts comprise elastic bushings arranged between each of the pair of pitch control struts and each of their respective pins; and wherein the strut mountings of the roll control strut comprise elastic bushings arranged between the roll control strut and each of their respective pins.

14. The mounting arrangement as claimed in claim 10, wherein the strut mountings of each of the pair of pitch control struts comprise elastic bushings arranged between each of the pair of pitch control struts and each of their respective pins; and wherein the strut mountings of the roll control strut comprise elastic bushings arranged between the roll control strut and each of their respective pins.

15. The mounting arrangement as claimed in claim 11, wherein the elastic bushings have a low conical stiffness in comparison to their radial stiffness about their respective pins.

16. The mounting arrangement as claimed in claim 11, wherein the elastic bushings have a low torsional stiffness in comparison to their radial stiffness about their respective pins.

17. The mounting arrangement as claimed in claim 15, wherein the elastic bushings have a low torsional stiffness in comparison to their radial stiffness about their respective pins.

18. The mounting arrangement as claimed in claim 11, wherein the powertrain has a weight; and wherein the radial stiffness rate of the elastic bushings vary about each pin in such a way that, when the weight of the powertrain acts on the mounting arrangement, the radial stiffness about the pin is substantially constant.

19. The mounting arrangement as claimed in claim 15, wherein the powertrain has a weight; and wherein the radial stiffness rate of the elastic bushings vary about each pin in such a way that, when the weight of the powertrain acts on the mounting arrangement, the radial stiffness about the pin is substantially constant.

20. The mounting arrangement as claimed in claim 16, wherein the powertrain has a weight; and wherein the radial stiffness rate of the elastic bushings vary about each pin in such a way that, when the weight of the powertrain acts on the mounting arrangement, the radial stiffness about the pin is substantially constant.

21. The mounting arrangement as claimed in claim 17, wherein the powertrain has a weight; and wherein the radial stiffness rate of the elastic bushings vary about each pin in such a way that, when the weight of the powertrain acts on the mounting arrangement, the radial stiffness about the pin is substantially constant.

22. The mounting arrangement as claimed in claim 1, wherein the pair of pitch control struts are oriented such that each of the pair of pitch control strut is substantially directed towards the torque axis of the engine.

23. The mounting arrangement as claimed in claim 1, wherein the strut mounting of the roll control strut at the powertrain is located at the powertrain's periphery.

24. The mounting arrangement as claimed in claim 1, wherein the roll control strut is oriented to be substantially perpendicular to the torque axis.

25. The mounting arrangement as claimed in claim 1, wherein the powertrain further comprises a transmission housing securely mated at one end of the engine and the primary mounting point is rigidly attached to the transmission housing.

26. The mounting arrangement as claimed in claim 25, wherein the strut mountings of the pair of pitch control struts at the powertrain are attached to the engine at an end of the engine remote from the transmission housing.

27. The mounting arrangement as claimed in claim 1, wherein the engine is an internal combustion engine, the engine comprises an engine block, and the strut mountings are attached to the engine block.

28. The mounting arrangement as claimed in claim 1, wherein the pair of pitch control struts lie in a common plane perpendicular to the torque axis.

29. The mounting arrangement as claimed in claim 1, wherein the engine has a length along the direction of the torque axis, and wherein a distance in the direction of the torque axis between the primary mounting point and the strut mountings of the pair of pitch control struts at the powertrain is at least the length of the engine along the direction of the torque axis.

30. The mounting arrangement as claimed in claim 1, wherein the strut mountings of the pair of pitch control struts at the powertrain lie on either side of the plane defined by the torque axis and the primary mounting point.

31. The mounting arrangement as claimed in claim 1, wherein the primary coupling, the pair of pitch control struts and the roll control strut are the only structural connections between the vehicle and the powertrain.

32. The mounting arrangement as claimed in claim 1, wherein the engine is mounted in the vehicle such that the torque axis is substantially parallel to a major direction of travel of the vehicle.

* * * * *